United States Patent Office 3,592,601

Patented July 13, 1971

3,592,601

SEPARATION OF BROMINE FROM GASEOUS MIXTURES CONTAINING OXIDES OF NITROGEN

Leopold Golser, Ludwigshafen, Hans-Martin Weitz, Frankenthal, and Walter Appelt, Ludwigshafen, Germany, assignors to Badische Anilin- & Soda-Fabrik Aktiengesellschaft, Ludwigshafen (Rhine), Germany No Drawing. Filed Oct. 22, 1968, Ser. No. 769,745
Claims priority, application Germany, Oct. 24, 1967, P 16 67 396.4
Int. Cl. C01b *7/10*
U.S. Cl. 23—216 1 Claim

ABSTRACT OF THE DISCLOSURE

For the separation of bromine from gaseous mixtures which, in addition to bromine, contain oxides of nitrogen with less than pentavalent nitrogen and with or without nitrosyl bromide, at least as much oxygen is added as is necessary for converting the nitrogen of the oxides or nitrosyl bromide into the pentavalent state. These mixtures are then treated with water or dilute aqueous nitric acid.

It is known to liberate bromine from aqueous solutions containing bromide, such as may occur in bromination reactions of organic compounds or as are formed in treating seawater, by treatment with nitric acid. Gaseous mixtures are obtained which contain, in addition to bromine, oxides of nitrogen with less than pentavalent nitrogen and nitrosyl bromide. Depending on the concentration of the nitric acid, varying amounts of nitrogen monoxide and nitrogen dioxide are mainly obtained.

These mixtures cannot be worked up by distillation, because bromine and nitrogen dioxide form an azeotropic mixture (boiling point 17° C. [760 mm.]). Further, nitrosyl bromide has to be decomposed and worked up in a special operation.

We have now found that such mixtures can be worked up in a single operation with the recovery of pure bromine and nitric acid when at least an amount of oxygen is added to the gaseous mixtures such as is necessary for converting the nitrogen of the oxides or nitrosyl bromide into the pentavalent state and these mixtures are then treated with water or aqueous nitric acid.

According to the process according to the invention it is possible to re-extract the nitric oxides, with formation of nitric acid, from the said gaseous mixtures and to use them again for the oxidation of further bromide.

In this treatment, the oxides of nitrogen are converted, in the presence of water or dilute aqueous nitric acid, into aqueous nitric acid or, when aqueous nitric acid is used, into aqueous nitric acid of a higher concentration by the action of the oxygen which may be added to the mixtures as such or in the form of air. The amount of oxygen must be at least sufficient to convert lower valency nitrogen into the pentavalent state. Preferably 2 to 10 times the stoichiometric amount of oxygen is used. In this treatment the nitrosyl bromide decomposes simultaneously into nitrogen monoxide and bromine, the nitrogen monoxide being converted into nitric acid.

The process is preferably carried out at atmospheric pressure or at slight superatmospheric pressure for example up to 5 atmospheres gauge. If need be, the process may of course be carried out at higher pressures, for example when the gaseous mixtures to be treated are at a higher pressure, i.e. the process may be operated at pressures of 100 atmospheres gauge or above without difficulty.

The temperature to be maintained depends on the composition of the gaseous mixture and should be above the dew point of bromine to prevent bromine condensation in the column. Temperatures are therefore advantageously used which are above the dew point of bromine but below the boiling point of the absorption liquid at the prevailing pressure. Temperatures up to 50° C., e.g. up to 5° C., above the boiling point of bromine at the pressure used are therefore usually employed.

Either water or nitric acid having a concentration advantageously not above 50% by weight may be used as absorbent.

The reaction may be carried out in any apparatus with the aid of which gases and liquids may be brought into contact. Advantageously the reaction is carried out in a column such as is normally used for distillation processes, liquid and gas being passed countercurrent. In the column a nitric acid is formed, whose concentration depends on whether water or dilute nitric acid is used initially, which nitric acid, if desired after dilution and bleeding off of some of the acid, may be recycled to the column. Depending on the conditions chosen, especially depending on the residence time of the acid in the reaction chamber, it is possible with the process according to the invention to obtain acids, starting from water, having a concentration of up to 60–68% by weight of $HNO_3$. In a similar way, it is of course also possible, when using low concentration nitric acid as absorbent, to increase the concentration.

Depending on concentration and temperature, the nitric acid occurring in the process contains small amounts of physically dissolved bromine, which however can be removed for example by simply boiling the acid. The nitric acid obtained in this manner may for example be used again for oxidation of bromides.

The following examples illustrate the process according to the invention, but the invention is not restricted to the examples.

EXAMPLE 1

A gaseous mixture consisting of 1 part by volume of vaporous bromine, 0.8 part by volume of nitrogen dioxide and 0.4 part by volume of oxygen is passed in an amount of 45 liters per hour in the bottom of a bubble cap tray column which contains 25 actual trays, and aqueous, 12.1% by weight nitric acid in an amount of 1 liter per hour is passed in at the top of the column. The pressure in the column is 1 atmosphere absolute, and the temperature in the column is 65° to 70° C. The aqueous nitric acid formed as bottoms has a concentration of 17.2% by weight, and—after the elementary bromine has been boiled out—a bromine content in the form of bromide ions of less than 0.01% by weight. 20.3 liters of pure bromine per hour is formed as tops, in which no nitrogen compounds can be detected by analysis.

EXAMPLE 2

A gaseous mixture consisting of 1 part by volume of vaporous bromine, 0.6 part by volume of nitrogen dioxide and 0.4 part by volume of oxygen is passed in a total volume of 53 liters per hour under the lowest tray of a bubble cap tray column containing 25 actual trays. Aqueous, 15.6% by weight nitric acid is fed to the topmost tray of the column, said column being operated at a pressure of 5 atmospheres absolute and at a temperature of 130° to 135° C. The aqueous nitric acid leaving the column as bottoms has a concentration of 36.7% by weight, and—after the dissolved elementary bromine has been boiled out—a bromide content in the form of bromide ions of less than 0.01% by weight. In the bromine leaving the column as tops there are no nitrogen compounds detectable by analysis.

We claim:

1. A process for the separation of bromine from mixtures which contain bromine and oxides of nitrogen with less than pentavalent nitrogen which comprises: treating said mixtures with oxygen in such an amount as is at least necessary for the conversion of the nitrogen of the oxidic compounds to the pentavalent state in the presence of water or aqueous nitric acid as absorption liquid at temperatures above the dew point of bromine and below the boiling point of the absorption liquid, thus converting said oxidic compounds of nitrogen into aqueous nitric acid, and separating the bromine from the aqueous nitric acid.

References Cited

UNITED STATES PATENTS

| | | | |
|---|---|---|---|
| 1,267,638 | 5/1918 | Datta | 23—216 |
| 2,878,105 | 3/1959 | Walter | 23—219 |
| 3,131,028 | 4/1964 | Stow, Jr. | 23—216X |

OSCAR R. VERTIZ, Primary Examiner

G. O. PETERS, Assistant Examiner

U.S. Cl. X.R.

23—157